United States Patent
Guo et al.

(10) Patent No.: US 12,336,456 B2
(45) Date of Patent: Jun. 24, 2025

(54) CONTROL SYSTEM AND METHOD FOR INCREASING ROTOR SPEED DURING COMBINE ROTOR START-UP

(71) Applicant: CNH Industrial America LLC, New Holland, PA (US)

(72) Inventors: Haibo Guo, Naperville, IL (US); Nicholas J. Laufenberg, Glen Ellyn, IL (US); Michael Rush, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 823 days.

(21) Appl. No.: 17/527,704

(22) Filed: Nov. 16, 2021

(65) Prior Publication Data

US 2023/0148477 A1 May 18, 2023

(51) Int. Cl.
*A01F 12/56* (2006.01)
*A01F 7/06* (2006.01)
*F16H 47/04* (2006.01)

(52) U.S. Cl.
CPC ............. *A01F 12/56* (2013.01); *F16H 47/04* (2013.01); *A01F 7/06* (2013.01)

(58) Field of Classification Search
CPC ............. A01F 12/56; A01F 7/06; F16H 47/04
USPC ........................................................ 460/22
See application file for complete search history.

(56) References Cited

U.S. PATENT DOCUMENTS

| 5,660,041 A | 8/1997 | Hartung et al. |
| 5,873,227 A | 2/1999 | Arner |
| 6,059,656 A | 5/2000 | Satzler |
| 6,695,693 B2* | 2/2004 | Ho .................. A01D 41/127 56/10.2 H |
| 6,702,666 B2* | 3/2004 | Ho .................. F16H 61/46 56/10.2 H |
| 7,062,368 B2* | 6/2006 | Ho .................. A01D 41/1274 56/10.2 G |
| 7,186,201 B2* | 3/2007 | Brome .............. A01D 41/1274 475/260 |
| 8,074,433 B2 | 12/2011 | Sheidler et al. |
| 8,781,694 B1 | 7/2014 | Sheidler et al. |
| 9,765,500 B2* | 9/2017 | Miyamoto ............. F16H 3/728 |
| 2004/0018864 A1* | 1/2004 | Ho .................. B60K 17/28 460/59 |
| 2008/0034720 A1 | 2/2008 | Helfrich et al. |
| 2008/0155974 A1* | 7/2008 | Aitzetmueller ........ F16H 47/04 74/460 |

(Continued)

FOREIGN PATENT DOCUMENTS

| EP | 1382885 A1 | 1/2004 |
| EP | 1382891 A2 | 1/2004 |

(Continued)

OTHER PUBLICATIONS

Extended European Search Report and Written Opinion for EP Application No. 22207459.3 dated Mar. 29, 2023 (8 pages).

*Primary Examiner* — Colby M Hansen

(74) *Attorney, Agent, or Firm* — Peter K. Zacharias; Rebecca L. Henkel; Rickard K. DeMille

(57) ABSTRACT

An agricultural vehicle has an engine, a threshing rotor, and a rotor drive system including a planetary gear assembly and a fluid circuit for driving the rotor at a constant acceleration during a start-up procedure of the rotor.

12 Claims, 4 Drawing Sheets

(56) References Cited

U.S. PATENT DOCUMENTS

| | | | |
|---|---|---|---|
| 2011/0031053 A1* | 2/2011 | Carl | F16H 47/04 |
| | | | 180/165 |
| 2014/0278041 A1* | 9/2014 | Brenninger | F16H 61/472 |
| | | | 701/124 |
| 2015/0367851 A1* | 12/2015 | Yoshizawa | B60K 6/54 |
| | | | 701/48 |
| 2017/0101100 A1* | 4/2017 | Lister | F16H 47/04 |

FOREIGN PATENT DOCUMENTS

| | | |
|---|---|---|
| JP | 2011188780 A | 9/2011 |
| JP | 2017055711 A | 3/2017 |

* cited by examiner

CONTROL SYSTEM AND METHOD FOR INCREASING ROTOR SPEED DURING COMBINE ROTOR START-UP

FIELD OF THE INVENTION

The invention relates to a combine harvester, and more particularly, to a rotor of a combine, and a method for increasing the speed of the rotor at a constant rate during a start-up procedure for the rotor.

BACKGROUND OF THE INVENTION

Combine harvesters commonly include a threshing and separating system comprising a rotor at least partially enclosed by and rotatable within a corresponding perforated concave. It would be desirable to ramp-up rotation of the rotor while reducing vibrations of the combine.

SUMMARY OF THE INVENTION

According to one aspect of the invention, in an agricultural vehicle having an engine; a threshing rotor; a planetary gear assembly including (i) a first gear (e.g., a ring gear) that is mechanically connected to an output shaft of the engine, (ii) a second gear (e.g., a sun gear), and (iii) a carrier that is mechanically connected to both the first gear and the second gear, the carrier also being connected to the rotor for driving the rotor; and a fluid circuit including (i) a reversible pump that receives power from the engine and (ii) a motor that is fluidly connected to the pump and has an output shaft that is connected to the second gear for driving the second gear, a method of rotating the rotor during a start-up procedure for the rotor, said method comprising the following steps:
  (a) operating the pump to drive the motor in a forward direction, which rotates the second gear in a forward direction, which rotates the carrier in a forward direction, which rotates the rotor in a forward direction, all while the first gear remains stationary;
  (b) rotating the first gear, which rotates the carrier in concert with the second gear of step (a) while the rotor continues to rotate the rotor in the forward direction; and
  (c) operating the pump to drive the motor in a reverse direction, which rotates the second gear in a reverse direction while the carrier and the rotor continue to rotate in their forward directions, which step yields a substantially constant acceleration of the rotor over steps (a) through (c).

According to another aspect of the invention, in an agricultural vehicle having an engine; a threshing rotor; a planetary gear assembly including (i) a first gear that is mechanically connected to an output shaft of the engine, (ii) a second gear, and (iii) a carrier that is mechanically connected to both the first gear and the second gear, the carrier also being connected to the rotor for driving the rotor; a clutch having an input member that is either directly or indirectly connected to the output shaft of the engine and an output member that is connected to the first gear; and a fluid circuit including (i) a reversible pump that receives power from the engine and (ii) a motor that is fluidly connected to the pump and has an output shaft that is connected to the second gear for driving the second gear, a method of rotating the rotor during a start-up procedure for the rotor, said method comprising the following steps:
  (a) operating the pump to drive the motor in a forward direction, which rotates the second gear in a forward direction, which rotates the carrier in a forward direction, which rotates the rotor in a forward direction, all while the first gear remains stationary;
  (b) partially engaging the clutch to rotate the output member of the clutch, which rotates the first gear, which rotates the carrier in concert with the second gear of step (a) while the rotor continues to rotate in the forward direction; and
  (c) operating the pump to drive the motor in a reverse direction, which rotates the second gear in a reverse direction while the carrier and the rotor continue to rotate in their respective forward directions, which step yields a substantially constant acceleration of the rotor over steps (a) through (c).

According to yet another aspect of the invention, in an agricultural vehicle having an engine; a threshing rotor; and a rotor drive system comprising a hydraulic branch and a separate mechanical branch that each receive power from the engine, a method of starting the rotor comprises: activating the rotor using the hydraulic branch and the mechanical branch while maintaining a constant acceleration of the rotor.

DETAILED DESCRIPTION OF THE INVENTION

Aspects of the disclosure provide an agricultural vehicle having an engine, a threshing rotor, and a rotor drive system including a planetary gear assembly and a fluid circuit for driving the rotor at a constant acceleration during a start-up procedure of the rotor.

Figure 1:
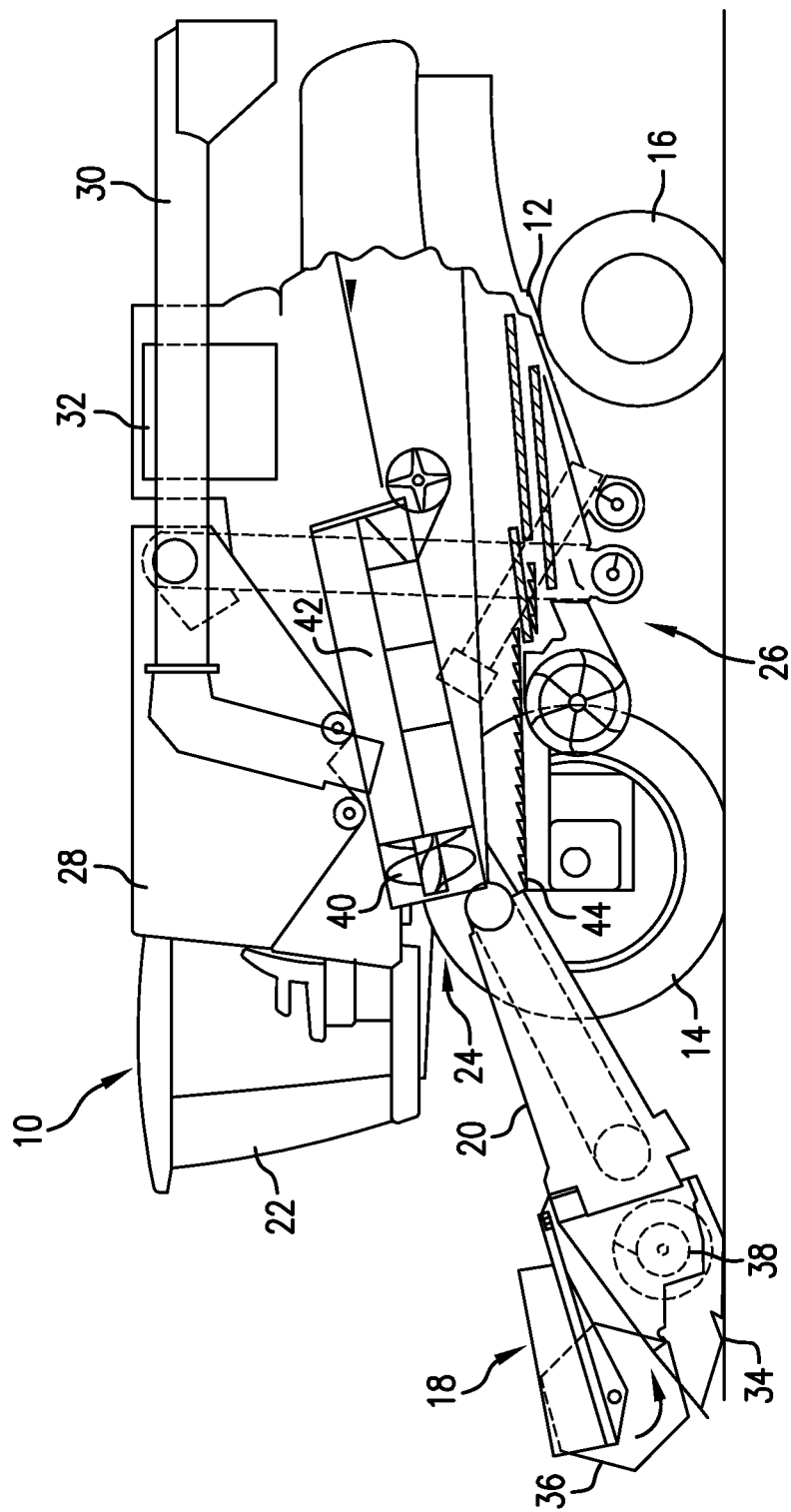
FIG. 1 is a side view of an embodiment of an agricultural harvester in the form of a combine, wherein the combine is shown schematically.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14, and/or the rear wheel 16, through a power plant in the form of an engine 32 and a transmission (not shown).

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material are discharged through perforations of the concave 42. Grain that has been separated by the threshing and separating assembly 24 falls onto a grain pan 44 and is conveyed toward the cleaning system 26. Further details of the combine 10 are disclosed in U.S. Pat. No. 9,907,228, which is incorporated by reference herein in its entirety and for all purposes.

Figure 2:
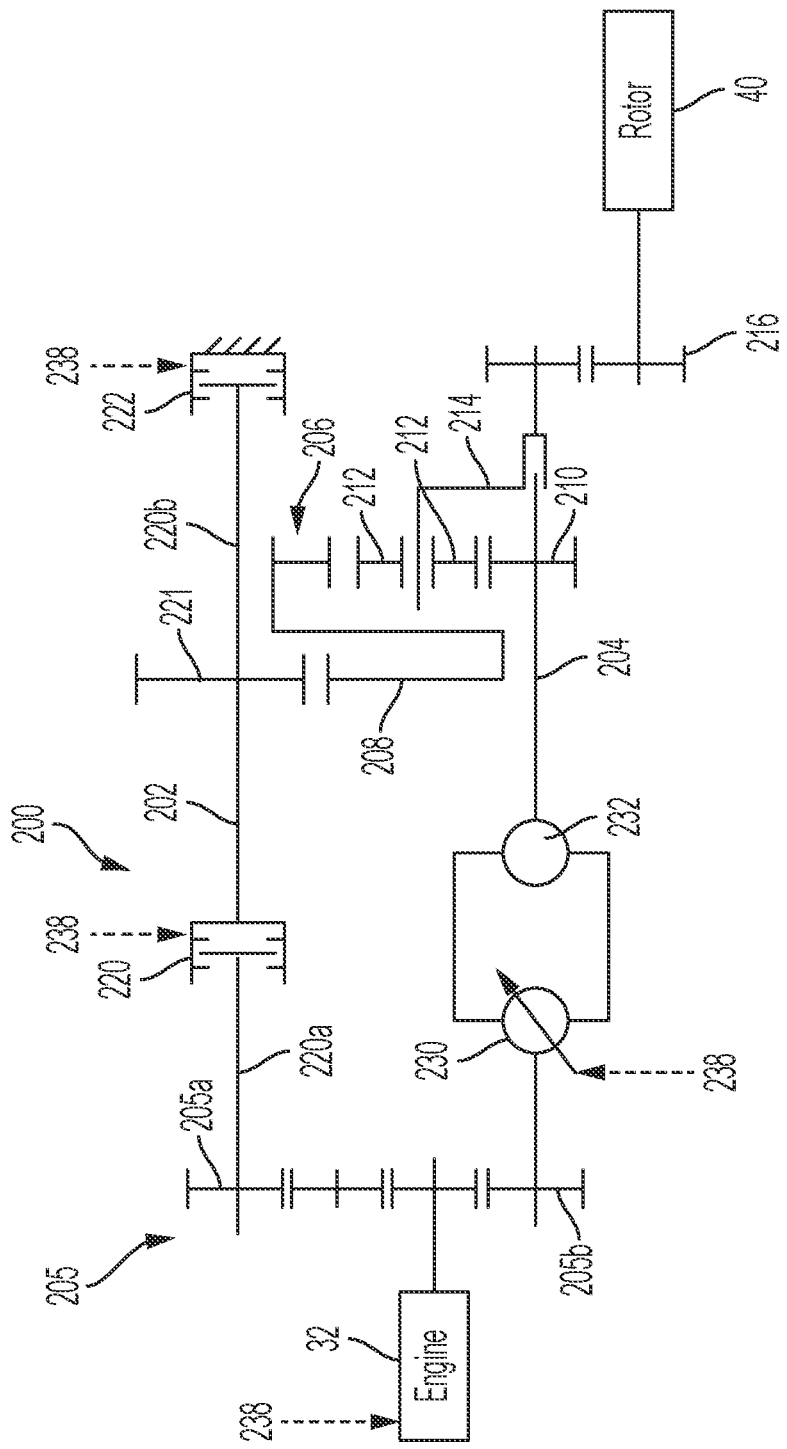
FIG. 2 is a schematic showing a rotor drive system for driving a rotor of the combine.

FIG. 2 depicts a combine rotor hydro-mechanical CVT (continuously variable transmission) drive system 200 for driving rotor 40 of combine 10. It should be understood at the outset that system 200 is not limited for use with combine 10, and the features and functions of combine 10 can vary greatly.

System 200 provides a rotor drive with flexible speed selection and optimization for harvesting and threshing. In operation of engine 32, for purpose of driving rotor 40, power produced by engine 32 is split into two branches, namely, a mechanical branch 202 and a hydraulic (or hydrostatic) branch 204. Branches 202 and 204 are operatively connected together by a planetary gear assembly 206. A gear box 205 having a plurality of interconnected gears is mechanically connected to and driven by an output shaft of engine 32. One gear 205a of gear box 205 is connected to drive mechanical branch 202 and another gear 205b of gear box 205 is connected to drive hydraulic branch 204. Mechanical connections (e.g., shafts, gears, etc.) are depicted by solid lines in FIG. 2. Of course, the arrangement of gear box 205 can vary from that which is shown.

As shown in FIG. 2, planetary gear assembly 206 comprises an outer ring gear 208 that is connected to a sun gear 210 by a plurality of planet gears 212 (one shown). Planet gears 212 are each connected to a carrier 214. It should be understood that rotation of ring gear 208 and/or sun gear 210 causes rotation of carrier 214. The mechanical branch 202 is connected to ring gear 208 for rotating ring gear 208, as desired. The hydraulic branch 204 is connected to sun gear 210 for rotating sun gear 210, as desired. In FIG. 2 it is noted that only the top halves of gears 208 and 210 are shown, and the other planet gears 212 are not shown. Gears 208, 210 and 212 rotate about their respective axes which are (optionally) parallel to one another. It should be understood that gears 208, 210 and 212 and carrier 214 can rotate simultaneously.

Power transmitted by engine 32 onto gears 208 and 210 is summed up at carrier 214, which drives rotor gearbox 216, which drives rotor 40. As background, the rotational speed of the carrier (Nc) is given by the equation: $Nc=(Ns*Zs+Nr*Zr)/(Zs+Zr)$; where c=carrier, s=sun gear, r=ring gear, Z=number of gear teeth, and N=speed (rpm). It should be understood that, during operation in hydro-mechanical mode, a reduction in the speed of sun gear (for example) will result in a reduction of the carrier speed (Nc), and, conversely, an increase in the speed of sun gear will result in an increase of the carrier speed (Nc). According to the embodiment of planetary gear assembly 206 shown herein, Zr is significantly greater than Zs, and, for at least that reason, the rotational speed of the carrier (Nc) will have a positive value (i.e., indicating forward rotation) during start-up of rotor 40.

Turning now to FIG. 2, carrier 214 is fixedly connected to the input of a rotor gear box 216. While one gear set of rotor gear box 216 is shown, rotor gear box 216 includes a plurality of gear sets for varying the output torque and speed of the output shaft of gear box 216. The output shaft of gear box 216 is fixedly connected to rotor 40 for rotating rotor 40. A clutch 220 is connected between gear 205a and ring gear 208 for engaging and disengaging the power applied to ring gear 208 by engine 32. Clutch 220 includes an input member (e.g., shaft) 220a connected to gear 205a and an output member (e.g., shaft) 220b connected to ring gear 208. Output member 220b includes a gear 221 that is connected to (i.e., meshed with) ring gear 208. Gear 221 is non-rotatably connected to member 220b. A brake 222 is also connected to output member 220b for either stopping or slowing output member 220b, thereby either stopping or slowing ring gear 208.

Hydraulic branch 204 comprises a fluid circuit, a fluid pump 230, which is powered by engine 32, and a motor 232. Fluid pump 230 drives motor 232, and motor 232 rotates sun gear 210.

A controller 238 is connected to engine 32, pump 230, clutch 220, and brake 222 (among other components) for controlling operation of those components. For example, controller 238 controls the swash rate and flow direction of pump 230, as well as the engagement of clutch 220, and the activation of brake 222.

As background to the invention, in the course of ramping-up rotor 40, if one were to initially rotate rotor 40 using hydraulic branch 204, and, thereafter, activate mechanical branch 202 to rotate rotor 40 (i.e., by fully engaging clutch 220), then the rotor 40, with huge inertia, would generate vibrations due to the rapid acceleration from the speed produced by hydraulic branch 204 (e.g., 200 rpm) to the significantly higher speed produced by mechanical branch 202 (e.g., 1000 rpm).

Described hereinafter is a control strategy for ramping up the rotor speed, in the form of a method for ramping-up rotor 40 to its target speed at constant acceleration. Constant acceleration of rotor 40 yields a smooth and continuous startup process, which reduces vibrations, improves operator comfort, shortens the rotor engagement time and increases productivity.

Figure 3:
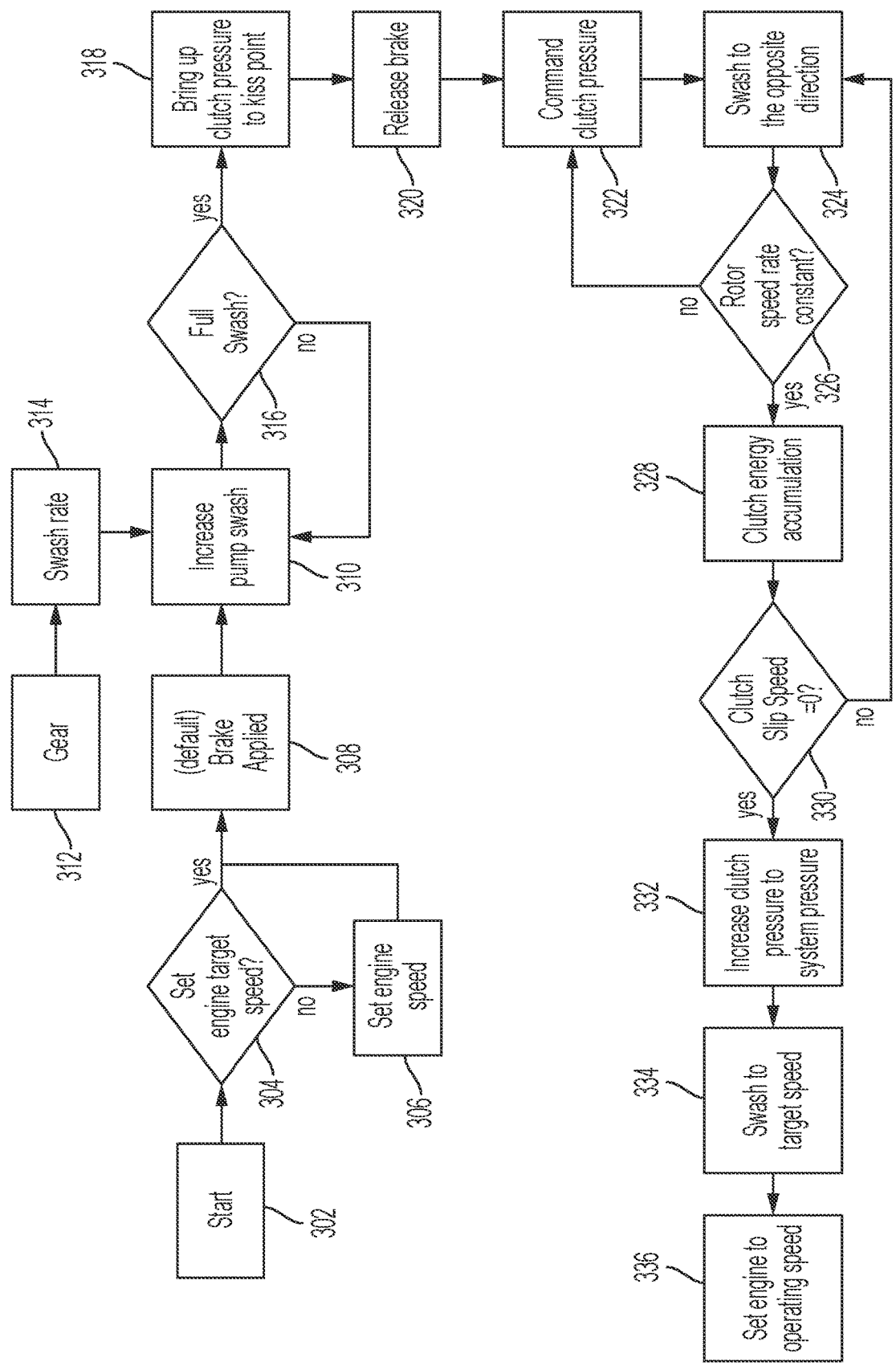
FIG. 3 is a block diagram depicting a process for setting a rotor speed of the combine.
Figure 4A:
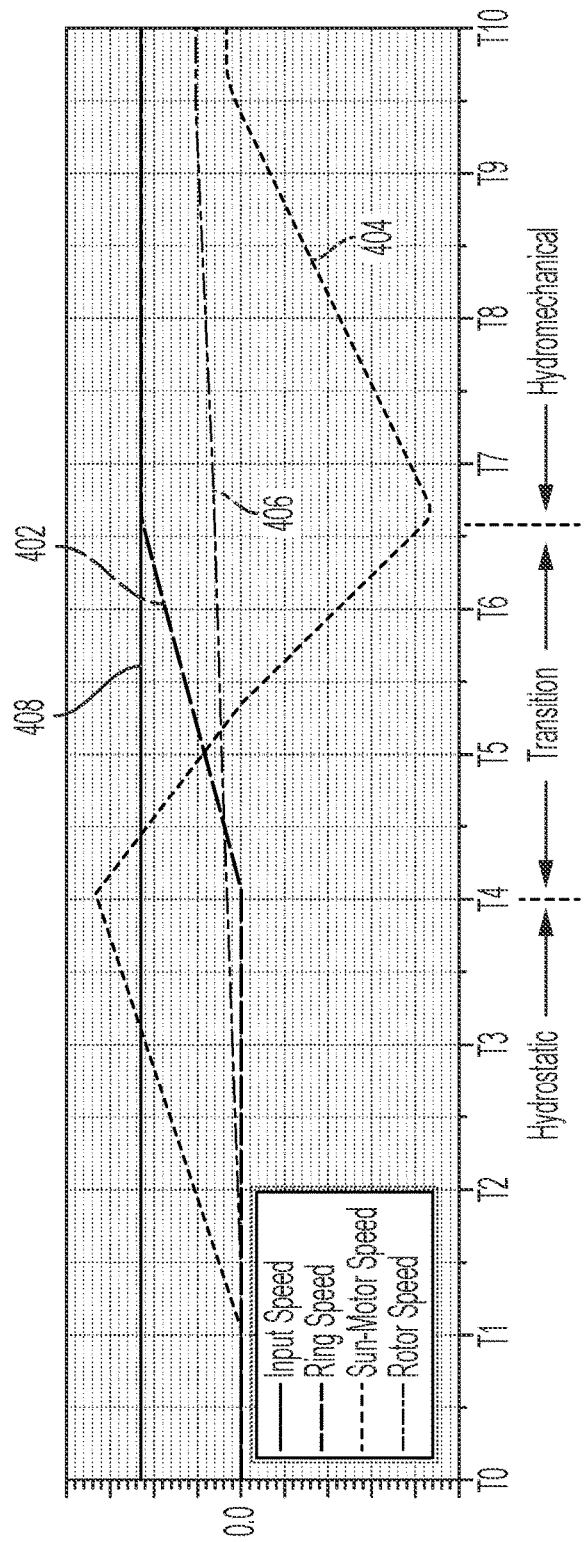
FIG. 4A is a graph depicting over time the speed of various components of the rotor drive system of the combine.
Figure 4B:
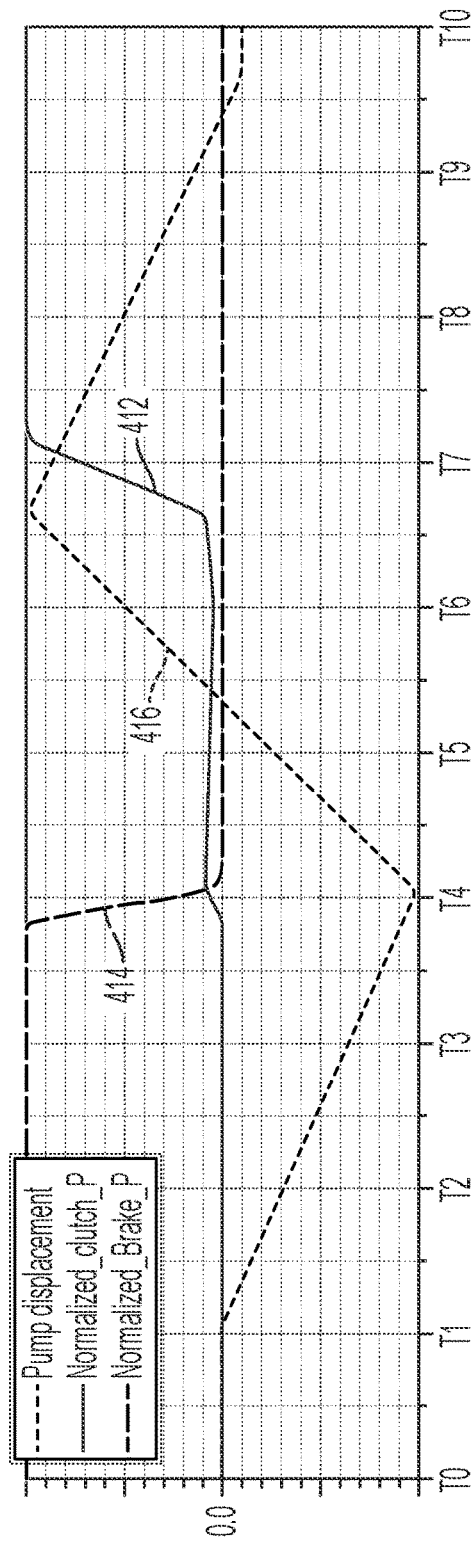
FIG. 4B is a graph depicting over time the pressure of various components of the rotor drive system of the combine.

FIG. 3 will be described hereinafter with reference to the graphs shown in FIGS. 4A and 4B. FIG. 4A is a graph depicting over time the speed of various components of rotor drive system 200. Depicted in the graph are the rotational speeds of ring gear 208 (labeled "RingSpeed", line 402), sun gear 210 (Sun-Motor Speed, line 404), rotor 40 (Rotor Speed, line 406), and the input speed of clutch 220 (Input Speed, line 408), which is also the speed of gear 205a. FIG. 4B is a graph depicting over time the input control parameters of various components of rotor drive system 200. Depicted in that graph are the operating pressures of clutch 220 (labeled "Normalized_clutch_P", line 412), brake 222 ("Normalized_Brake_P", line 414), and pump 230 (Pump Displacement, line 416).

Turning now to FIGS. 3-4B, the process begins at 302 by activating combine 10. At steps 304 and 306, an operator sets the speed of engine 32, for example at 1000 rpm. See also straight line 408 at time TO in FIG. 4A. Engine speed (optionally) remains constant through the rotor start-up process. Once engine 32 begins operation, rotor 40 begins rotating in a hydrostatic drive mode (i.e., powered by hydraulic branch 204) while, at step 308, brake 222 holds ring gear 208 stationary. During this time, at step 310, pump 230 is swashed in the forward direction to accelerate rotor 40 to the maximum pure hydrostatic drive speed (i.e., full swash). See also lines 404 and 416 at time T1-T4 in FIGS. 4A and 4B, which depict a decrease in the pump displacement and an increase in the speed of sun gear 210. At steps 312 and 314, for each gear available in rotor gear box 216, a swash rate for pump 230 is defined that will limit the hydrostatic system pressure to a value below a relief setting.

Following step 316, the "hydrostatic" stage ends and the "transition" stage begins at about time T4.

At step 318, when pump 230 has reached the maximum swash in the forward direction (as checked at step 316), the pressure of clutch 220 is then increased to the kiss-point pressure. See also line 412 near time T4 in FIG. 4B. The term "kiss point" of a clutch is defined herein as the position of a clutch when the two halves of the clutch make initial frictional contact without transmitting any torque therebetween.

Following step 318, brake 222 is released at step 320. See also line 414 at time T4 on FIG. 4B, which depicts a reduction in braking pressure. At step 322, clutch 220 is partially engaged (i.e., modulated so that clutch 220 slips) and, consequently, transmits torque between gear 205a of gear box 205 (input torque) and ring gear 208 such that ring gear 208 is powered by engine 32. See also lines 402 and 412 at time T4-T7 in FIGS. 4A and 4B, which depicts an increased in the speed of ring gear 208 and an increase in the pressure of clutch 220. At this transition stage, ring gear 208 transfers torque to carrier 214, which rotates rotor 40. It should be understood that carrier 214 always rotates in the same direction during the start-up process; and, likewise, rotor 40 always rotates in the same direction during the start-up process.

At or near the same time that the pressure of clutch 220 is increasing and transferring torque to ring gear 208, at step 324, pump 230 is swashed in the reverse direction, which switches the rotational direction of sun gear 210 from a forward direction to a reverse direction. See also lines 404 and 416 at time T4-T7 in FIGS. 4A and 4B, which depict an increase in the pump displacement and a sharp decrease in the speed of sun gear 210. Swashing pump 230 in the reverse direction at step 324 to switch the rotational direction of sun gear 210 reduces the gear ratio (i.e., applied torque) to carrier 214. In other words, driving sun gear 210 in the reverse direction counteracts the high torque/speed applied to carrier 214 by ring gear 208 (via engine 32). Again, as noted above, gear 205a of mechanical branch 202 drives ring gear 208 at a much higher speed than motor 232 of hydraulic branch 204 drives sun gear 210. Driving sun gear 210 in the reverse direction at step 324 to counteract the higher torque/speed applied to carrier 214 by ring gear 208 yields a constant acceleration of rotor 40. It should be understood that in the absence of the damping action provided by sun gear 210 at step 324, rotor 40 would be immediately subjected to the full speed of ring gear 208, which would cause undesirable vibrations.

It is noted that, during the transition stage, the pressure overlap between clutch 220 and brake 222 during reversal of the pump swash (at step 324) prevents rotor 40 from inadvertently slowing down or "drooping" and promotes a straight-line constant acceleration of rotor 40. Stated differently, during the transition stage, the combination of the (i) release of brake 222 by controller 238, (ii) modulation (i.e., partial engagement) of clutch 220 through closed loop pressure control by controller 238, and (iii) reversal of the pump swash by controller 238, holds the rotor acceleration rate constant through the full engagement of clutch 220, thereby avoiding the aforementioned undesirable vibrations of rotor 40 during the start-up phase. The rotor speed ramp rate is made constant using a combination of input control signals.

At step 326, the acceleration rate of rotor 40 is monitored by a sensor (not shown) to ensure that the acceleration rate is constant. See the constant slope of line 406 in FIG. 4A. If the acceleration rate is not constant, then the pressure of clutch 220 is adjusted accordingly at step 322. A PID loop, for example, may be utilized at steps 322/326 to maintain a constant acceleration rate.

A large amount of heat is generated due to the partial engagement of clutch 220. The temperature, or amount of energy, of clutch 220 may be monitored at step 328 to ensure that clutch 220 does not overheat.

At step 330, the slip speed of clutch 220 is monitored. More particularly, the rotational speed of ring gear 208 is monitored and compared with the input drive speed at gear 205a. This comparison is indicative of the engagement condition of clutch 220. If ring gear 208 has not reached its drive speed (indicating that clutch 220 is not fully engaged), the method returns to step 324 to modify the swash setting of pump 230. Once the ring gear speed reaches its drive speed, which indicates that clutch is fully synchronized and not slipping, the pressure of clutch 220 is increased at step 332 until the clutch pressure reaches the system pressure and clutch 220 is fully engaged. See also lines 402 and 412 at time T6-T7 in FIGS. 4A and 4B, which depict increases in the ring gear speed and the clutch pressure. Clutch 220 remains fully engaged through the remainder of the rotor start-up process, which is depicted as the "hydromechanical" stage in FIG. 4A. Also, at the hydromechanical stage, the rotational speed of ring gear 208 matches the speed of gear 205a (i.e., the engine speed) and the clutch 220 remains fully engaged (i.e., locked) through the remainder of the rotor start-up process as well as during operation.

At or near the same time as step 332, at step 334, the swash of pump 230 is reversed again and commanded by controller 238 to swash in the forward direction and rotate sun gear 210 in the forward direction. At this time, motor 232 increases the speed of sun gear 210, which increases the speed of carrier 214. See also lines 404 and 416 at time T7-T10 in FIGS. 4A and 4B. It is noted that combining the speeds (modulation) of the sun gear 210 and ring gear 208 results in a constant acceleration of carrier 214, and, therefore, constant acceleration of rotor 40. See line 406 at time T7-T10 in FIG. 4A. At step 336, the speed of engine 32 may also be adjusted which would, consequently, adjust the speed of rotor 40.

It is noted that the "constant" acceleration of rotor 40 may not be perfectly constant. For example, a tolerance of +/−5% or 10% may be acceptable.

While the method herein describes operating the clutch in a partially engaged state for a limited period of time, it should be understood that the method could also be practiced by fully engaging clutch 220 and activating brake 222 to slow rotation of ring gear 208 at time T4-T7. In such an alternative method, step 322 would be replaced by the step of fully engaging clutch 220, and a new step between steps 322 and 324 would comprise activating brake 222 to slow rotation of ring gear 208. And, step 332 could be omitted. As another alternative to partially engaging clutch 220, though not as preferable, the speed of engine 32 could be adjusted to slow rotation of ring gear 208 at time T4-T7.

Various components of system 200 are controlled by controller 238, as is indicated by the lines in FIG. 2. And, various steps of the method shown in FIG. 3 are performed by controller 238 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 238 described herein, such as the steps shown in FIG. 3, are implemented in software code or instructions which are tangibly stored on a tangible computer readable medium. Upon loading and executing such software code or instructions by the controller 238, the controller 238 may perform any of the functionality of the controller 238 described herein, including the steps shown in FIG. 3 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. In an agricultural vehicle having an engine; a threshing rotor; a planetary gear assembly including (i) a first gear that is mechanically connected to an output shaft of the engine, (ii) a second gear, and (iii) a carrier that is mechanically connected to both the first gear and the second gear, the carrier also being connected to the rotor for driving the rotor; a clutch having an input member that is either directly or indirectly connected to the output shaft of the engine and an output member that is connected to the first gear; and a fluid circuit including (i) a reversible pump that receives power from the engine and (ii) a motor that is fluidly connected to the pump and has an output shaft that is connected to the second gear for driving the second gear, a method of rotating the rotor during a start-up procedure for the rotor, said method comprising the following steps in the following order:
   (a) operating the pump to drive the motor in a forward direction, which rotates the second gear in a forward direction, which rotates the carrier in a forward direction, which rotates the rotor in a forward direction, all while the first gear remains stationary;
   (b) partially engaging the clutch to rotate the output member of the clutch, which rotates the first gear, which rotates the carrier in concert with the second gear of step (a) while the rotor continues to rotate in the forward direction; and
   (c) operating the pump on the fluid circuit to drive the motor in a reverse direction, which rotates the second gear in a reverse direction while the carrier and the rotor continue to rotate in their respective forward directions, which step yields a constant acceleration of the rotor within a predetermined tolerance over steps (a) through (c).

2. The method of claim 1, further comprising the step of braking the first gear during step (a).

3. The method of claim 2, wherein step (b) further comprises releasing the braking of the first gear.

4. The method of claim 2, wherein step (c) comprises adjusting a position of a swash plate of the pump.

5. The method of claim 1, further comprising the step of:
   (d) fully engaging the clutch to rotate the output member of the clutch at a faster speed, and, therefore, rotate the rotor in the forward direction at a faster speed.

6. The method of claim 5, further comprising the step of:
   (e) operating the pump to drive the motor in the forward direction, which rotates the second gear in the forward direction, which rotates the carrier in the forward direction in concert with the first gear, which rotates the rotor in the forward direction, which yields the constant acceleration of the rotor over steps (a) through (e).

7. The method of claim 6, wherein the first gear rotates in a same direction through steps (b) through (e), and the rotor rotates in a same direction through steps (a) through (e).

8. The method of claim 6, wherein step (e) is initiated after step (d).

9. The method of claim 1, wherein step (b) is initiated once the pump reaches a full swash in step (a).

10. The method of claim 1, wherein, in step (c), rotating the second gear in the reverse direction counteracts or dampens rotation of the carrier attributed to rotation of the first gear.

11. The method of claim 1 further comprising the step of monitoring an acceleration rate of the rotor by a sensor and adjusting a pressure of the clutch to ensure that the acceleration rate remains constant within the predetermined tolerance.

12. The method of claim 1, wherein the predetermined tolerance is either 5% or 10%.

* * * * *